Feb. 5, 1963     H. W. JADERHOLM     3,076,596
FERMI LEVEL CALCULATOR FOR SEMICONDUCTORS
Filed Nov. 4, 1957     2 Sheets-Sheet 1

INVENTOR:
Henrik Wilhelm Jaderholm.

Feb. 5, 1963  H. W. JADERHOLM  3,076,596
FERMI LEVEL CALCULATOR FOR SEMICONDUCTORS
Filed Nov. 4, 1957
2 Sheets-Sheet 2

INVENTOR
Henrik Wilhelm Jaderholm

United States Patent Office 3,076,596
Patented Feb. 5, 1963

3,076,596
FERMI LEVEL CALCULATOR FOR SEMICONDUCTORS
Henrik Wilhelm Jaderholm, P.O. Box 105,
St. Sauveur des Monts, Quebec, Canada
Filed Nov. 4, 1957, Ser. No. 694,308
Claims priority, application Canada June 29, 1957
3 Claims. (Cl. 235—61)

This invention relates to calculators of the sliderule type for the easy and quick solution of complicated mathematical equations, specifically to determine the electrical parameters of a semi-conductor when some other parameters are known and also to determine the chemical potential in chemical and solid state physical reactions.

A few graphical calculators for semiconductors have been devised in the past, as described in the following publications:

1. Shockley: Electrons and Holes in Semiconductors, Van Nostrand, 1950.
2. Lehovec and Kedesdy: Journ. Appl. Phys. 22, pp. 65–7, 1951
3. Mooser: Zeitschr. Angew, Math. u. Phys. 4, pp. 433–449, 1953
4. Spenke: Electronische Halbleiter, Springer, 1956.

In 1, 2 and 4 some drawing work is required when using the nomograms. In 3, a new sheet or drawing must be prepared for each new substance under consideration.

My invention overcomes these difficulties by inscribing the parameters permanently as lines or curves on slidable or rotatable discs or plates, some of which are transparent. When the discs have been rotated according to the information available in a particular problem, the answer comes out at an intersection of some of the lines. A slide-wire or hair-line with a scale is used to read out the answer.

The semiconductor calculator according to my invention can be prepared for detailed calculations on a particular substance, or equally well in an entirely universal form for semiconductors of widely varying energy gaps. These determinations, in addition, can be made over a wide range of temperatures.

Figure 1:
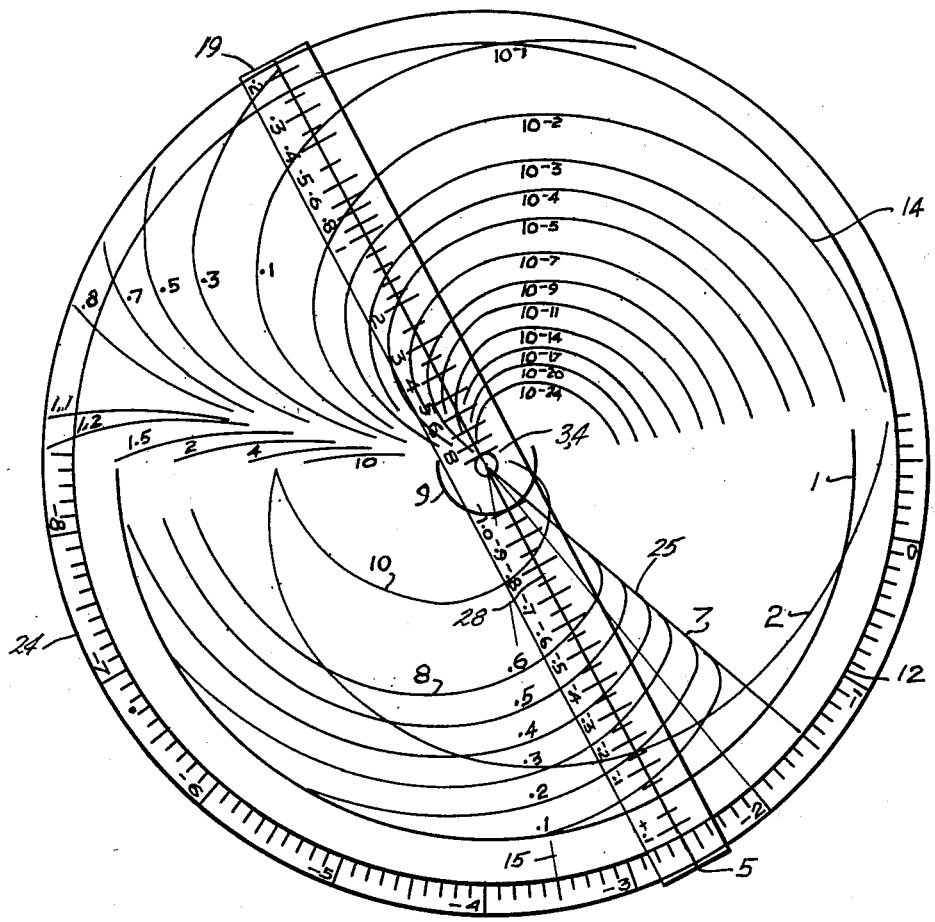
Figure 1A:
Figure 2:
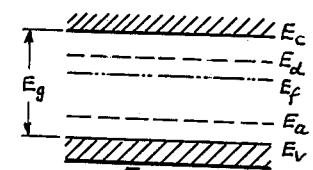
Figure 3:
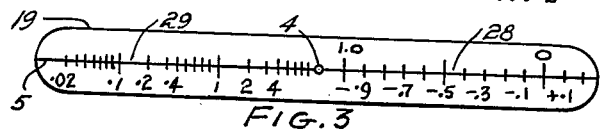
Figure 4:
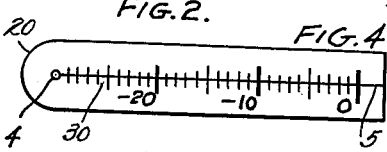
Figures 5, 5A:
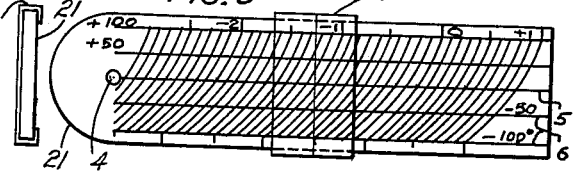
Figure 6:
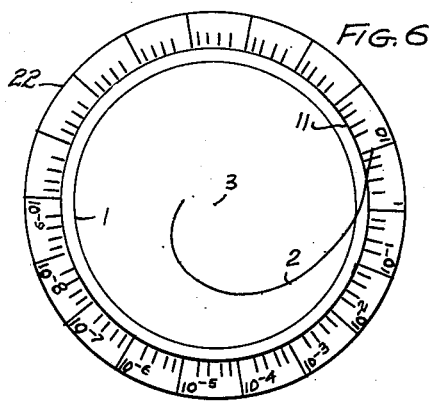
Figure 7:
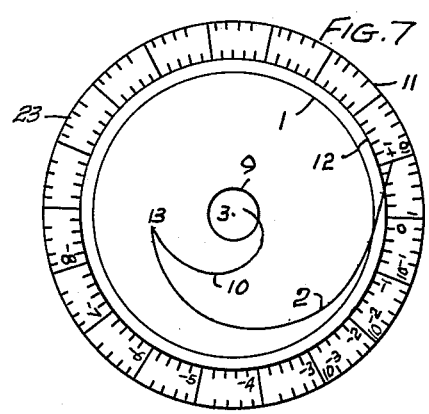
Figure 8:
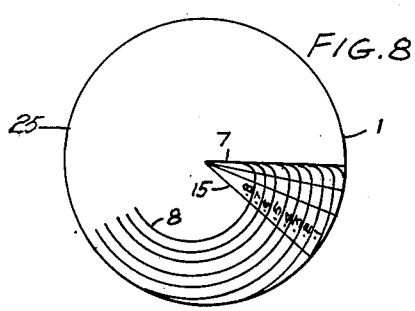
Figure 9:
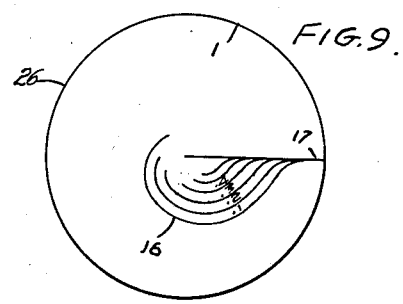
Figure 10:
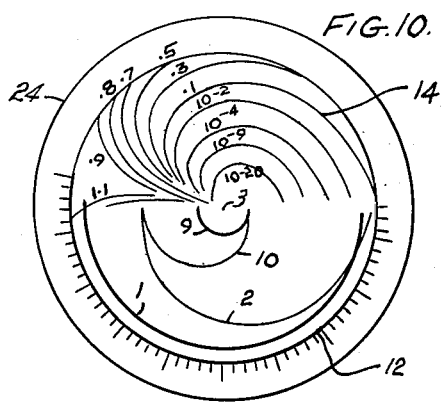
Figure 11:
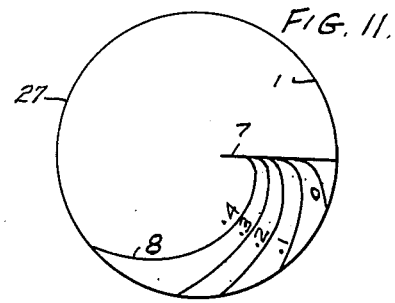

In the accompanying drawings FIG. 1 shows the top and FIG. 1A side views of a calculator having a base disc 24 and pivotally mounted thereon a transparent donor impurity disc 25, a transparent hairline cursor 19 and demountable pin 31, all rotatable about their centers 3 and 4; FIG. 2 is a schematic of the energy levels and the forbidden gap energy $E_g$ of a semiconductor; FIG. 3 shows a transparent hairline cursor 19 with a scale for normalized gap energies 28 at one end, for the gap-temperature multiplier at the other end, used with base disc 24 rotatably secured through pin hole 4 to center 3; FIG. 4 shows a simpler type hairline cursor 20 having a Fermi-energy scale in kT-units used with disc 22; FIG. 5 shows an alternative type of hairline cursor 21 used with base disc 22, provided with a slide-rule cursor 18 for temperature calculations, the side view of which is shown in FIG. 5A; FIG. 6 shows a simple type of base disc 22 made of non-warping opaque sheet provided with a logarithmic scale 11 along the periphery for the normalized carrier density and curve 2 relating through Eq. (1) said carrier density to the Fermi-energy measured radially from conduction band 1 towrads center 3 using cursor 20; FIG. 7 shows a base disc 23 having the conduction and valence band edges 1 and 9 respectively and using cursor 19 to measure negative normalized energies from band edge 1; FIG. 8 shows a transparent donor disc 25 presenting energy levels 8 and state of ionization lines 15; FIG. 9 shows an acceptor impurity disc 26 with normalized energy levels 16 measured from conduction band 1; FIG. 10 shows a base disc 24 carrying in its upper half a nomogram 14 for computing carrier density for varying gap-widths and temperatures using scale 29 on cursor 19. FIG. 11 is a donor disc 27 used on a base disc with an exponential Fermi-energy scale.

A semiconductor is a substance which can behave with some metallic characteristics while under other conditions it exhibits some of the properties of an insulator. The conditions arise from changes in temperature, electromagnetic radiation or the incidence of high energy particles, to name some external influences. Internally the purity of the substance and the deliberately introduced impurities determine its behaviour.

The semiconductor characteristics are described by an energy level diagram, shown in FIG. 2. The distance $E_g$ in energy units between the conduction band $E_c$ and the filled or valence band $E_v$ is called the forbidden gap. It gives the substance in a pure state and at a low temperature the characteristics of an insulator. All electrons which might give rise to conduction, luminescence, rectification or generation of an E.M.F. are in the valence band and only very few are in the conduction band. If the forbidden gap is small some electrons may be able to jump it due to thermal or other influences. The current which can flow in the semiconductor is determined (1), by the number of these electrons and (2), the holes which they left in the valence band, and the respective mobilities of these carriers. This is called intrinsic semiconduction which is easily handled by the present calculator.

The number of conduction electrons is greatly increased by the presence in the substance of a small number of impurities. These are generally classified as donors of density $n_d$ located at the energy $E_d$ if they are suppliers of electrons and as acceptors of density $n_a$ located at the energy $E_a$ if they are consumers of electrons. This is called extrinsic or impurity semiconductivity.

The number of electrons $n$ in the conduction band is $n = f(E) \cdot g(E)$ where $g(E)$ is a function expressing how many places or levels there are, and $f(E)$ is another function expressing their probability of being occupied.

If the gap $E_g$ is large (several times $kT$, where $k$ = Boltzman's constant and $T$ = absolute temperature) it is sufficient to use Boltzman statistics. Referring to the treatment by Blakemore in El Communication vol. 29, pp. 131–153, 1952, and rewriting into a form suitable for my calculator:

$$n = 2\left(\frac{2\pi m e k 300}{h^2}\right)^{3/2} \left(\frac{T}{300}\right)^{3/2} exp\frac{E_c - E_F}{kT}$$

$$= N_c \exp\frac{E_c - E_F}{kT} \tag{1}$$

where:

$E_F$ = Fermi-level
$N_c$ = numerical factor, essentially a material constant indicating number of electron levels
$m_e, m_h$ = effective mass of electrons and holes
$h$ = Planck's constant.

$N_v$ is used instead of $N_c$, and $m_h$ for $m_e$ when writing an equation similar to (1) for positive carriers or holes $p$.

When the gap is small (of the order of $kT$) it becomes necessary to use Fermi statistics. The electron density is then $$n = N_c f(F) \tag{2}$$

where F is the Fermi-function, integrals of which have been tabulated (ref. Blakemore).

Curve 2 is a graph of Eq. 1 inside circle 1. The normalized carrier density $n/N_c$ has a logarithmic scale 11 along the circumference.

$$\frac{E_c - E_F}{kT}$$

is measured along the radius from its zero at the edge of the conduction band 1. It has negative values inside the circle 1. Outside the circle it is positive, the energy levels are degenerate and Fermi-statistics Eq. 2 are in effect. A line drawn radially from the origin 3 to a given value $n/N_c$ on the periphery intersects curve 2 and the radial distance of this intersection to circle 1 is the Fermi-energy, referred to the edge of the conduction band 1. In FIG. 7 this energy is measured by placing the hairline cursor 19 with its center 4 pivotally over the origin 3 of the base disc 23, and reading the result from 0 as negative fractions of the normalized energy. (See also Eq. 7.) In FIG. 6 the cursor 20 functions as the movable radical hairline for the base disc 22. The cursor 20 is provided with pivot 4 for a pivotal connection at center 3 of the base disc 22, with a hairline 5 and a scale 30 for reading out the Fermi-energy.

If the majority carriers are holes, circle 1 may be used as the valence band and the peripheral scale for normalized hole density $p/N_v$.

In FIG. 6 it can be imagined that the minority carrier band is shrunk into point 3, the origin. For calculations where both types of carriers are present in appreciable numbers it is convenient to use the base disc 23. Here the circle 9 represents the minority carrier band edge and the curve 10 determines their density ratio.

In order to give expression to the influence of temperature the cursor 21 in FIG. 5, has in addition to the radial hairline 5 a family of parallel lines 6 showing temperatures from minus 100° C. to plus 100° C. The energy scale along the hairline 5 is for the reference temperature $T_{300}=300°$ K. (absolute temperature). The energy at other temperatures is found by projection normally to the radial line 5. A sliding cursor 18 of ordinary slide-rule type is provided to facilitate this read-out.

Up to this point the description has mostly dealt with intrinsic semiconductors which can be analyzed merely by base disc 22 and cursor 20 or disc 23 with cursor 19.

In problems involving impurity centers in the semiconductor the calculator will be provided with transparent donor and acceptor discs 25 and 26 shown in FIGURES 8 and 9 respectively, as required.

It can be shown that the number of ionized donors $n_d^+$ (which have "donated" their electrons to the conduction band) is:

$$n_d^+ = n_d \frac{1}{1+2exp\frac{E_c-E_F}{kT}exp-\frac{E_c-E_d}{kT}} \quad (3)$$

where:

$n_d$ = total number of donor impurities per unit volume (cm.$^3$)

Using Eq. 1 and dividing by $N_c$ one obtains:

$$\frac{n_d^+}{N_c} = \frac{n_d}{N_c} \frac{1}{1+2exp\frac{E_d-E_F}{kT}} \quad (4)$$

A similar expression can be derived for ionized acceptor impurities $n_a^-$ and $n_a$ using $N_v$.

In the case of an excess semiconductor having a substantial concentration of donors $n_d$ one has, in the steady state $$n = n_d^+$$

(neglecting the intrinsic density $n_i$)

On the calculator this case is handled by placing pivotally upon the base disc 23 the donor disc 25. The latter has a radial line 7 pointing to the normalized donor concentration $n_d/N_c$ on the peripheral scale 11, and branching out more or less spirally curves 8 which are drawn in accordance with Eq. 3 and are designated in normalized energy units to indicate the distance of the donors from the conduction band. The cursor 19 is added pivotally over these discs. The calculation will then be done as described in paragraph 3, page 10. The embodiment shown in FIG. 7 incorporates a feature which makes this calculator universally usable for various energy gaps and a wide range of temperatures.

From Equation 1 we obtain, for $E_c=0$, $$n/N_c = exp - E_f/kT \quad (5)$$

and $$-E_f/kT = \ln n/N_c \quad (6)$$

We divide now both sides by $-E_g/kT$ and find:

$$E_f/E_g = -kT/E_g \ln n/N_c \quad (7)$$

According to this equation, I can measure the radial energy distance from the conduction band edge 1 in fractions of the forbidden gap width $E_f/E_g$, and have plotted the scale 12 as the logarithm to the base 10 of $n/N_c$. The curve 2 has been drawn for the case where the forbidden gap $E_g=1$ electron volt, and for a room temperature of 300° K. The curve 2 for electrons meets the curve 10 for holes at the point 13 which is at $E_f/E_g=\frac{1}{2}$, if the effective masses of the carriers are equal. At this point $np=n_i^2$, for intrinsic semiconduction. The scale 11 in FIG. 7 measures $n/N_c$ for the case of $E_g=1$ ev.

Equation 7 shows that for any other value of gap the scale 12 (to the $\log_{10}(n/N_c)$) must be multiplied by the appropriate value of $E_g$. To find $n/N_c$ it is necessary to look up a table of logarithms.

Equation 7 shows similarly that for any temperature different from 300° K. the logarithm must be divided by the ratio $T/T_{300}$. This suggests the use in a universal calculator of the multiplier $$\frac{300\ E_g}{T}$$

FIGURE 10 shows an embodiment including a nomogram 14 which enables the multiplication and the extraction of $n/N_c$ without recourse to tables of logarithms. The lower semicircle of FIG. 10 includes the $n$ and $p$ curves 2 and 10, the conduction and valence band edges 1 and 9 respectively and the logarithmic scale 12, which is retained for precise calculations.

The upper semicircle includes a family of logarithmic spirals 14, marked for populations $n/N_c$ or $p/N_v$ from $10^{-20}$ to 1.1.

With this base disc we use the special hairline scale 19 shown in FIG. 3. The right hand end carries a linear energy scale 28 in fractions of $E_g$ while the left end has a scale 29 in terms of the multiplier derived above.

To use the calculator in an intrinsic case we would thus proceed as follows. For a known gap and Fermi level we would rotate the hairline 5 on cursor 19 until the distance between curve 2 and circle 1 corresponds to that fraction. We will then follow the hairline 5 to upper semicircle of base disc 24 and find at the value of the multiplier on the logarithmic scale 29, one of the spirals marked with the population ratio, otherwise same must be interpolated between two spirals.

The drawings and the values shown in FIGURES 3, 4, 5, 6, 7, and 10 are approximately correct but should not be used for calculations.

FIGURE 1 shows an assembly into an operating calculator of parts similar to those described in FIGURES 3, 8, and 10. On the base disc 24 are centrally, rotatably mounted the donor disc 25, FIG. 8, and the hairline rotor 19, FIG. 3.

To find the Fermi level in the case of an impurity semiconductor where the donor number and energy is known, we would proceed as follows.

Rotate the radial line 7 on donor disc 25 to the peripheral scale 12 on FIG. 1 opposite the log of the number $n_d/N_c$. Note the spiral line 8 marked with the donor energy depth fraction and observe the intersection of this line with the electron curve 2. Rotate the hairline 5 on cursor 19 to the intersection and read on the scale 28 the distance of the Fermi level from the conduction band edge circle 1. On scale 12 the hairline extension points to the logarithm of $n/N_c$ which can be evaluated for the given gap width by the attached gap temperature nomogram 14.

If the intersection of the donor line is not in its curved part but along the line 7, all donors are ionized. The donor discs 25 are provided with further radial lines 15 which, counting from the line 7 indicate 50%, 10% and 1% ionization of the donors respectively.

The case illustrated in FIG. 1 is one of impurity semiconduction with a donor level at .2 of the forbidden gap width and a total donor population ratio $\log(n_d/N_c) = -1.5$. When the donor disc is rotated into this position the intersection is found at $-.16$ of the gap. Thus if the gap is .77 ev., the Fermi level is at .123 ev. below the conduction band edge. The logarithm of electron population ratio is $-2.5$, and following the hairline into the nomogram, we find at room temperature for a gap width of .7 ev. an electron population ratio $n/N_c = .01$. For a temperature of 1220° abs. and above nominal gap we have a total multiplier .19 which gives a value $n/N_c = .3$.

The intersection occurs at the third radial line on the donor disc indicating a donor ionization of 10%.

If only holes and acceptors are present, greater accuracy of readings is obtained if in FIG. 1 the circle 1 is used as the valence band and the curve 2 for the hole population.

When electrons, donors and acceptors are present, an acceptor disc 26 of the type shown in FIG. 9 must be added concentrically to the calculator FIG. 1, between the donor disc and the cursor 19. The acceptor reference line 17 is set to the appropriate value $n_a/N_v$ on the peripheral scale. In general the depth of the acceptors does not much affect results near the conduction band. However some very deep acceptors (near cond. band) are shown in FIG. 9 as the curves 16. The figures labelling these lines are counted from the conduction band, for operating convenience. It happens frequently that the radial line of the donors is one or two decades above the radial line of the acceptors.

In that case the radial line 17 of the accepors intersects with the electron curve 2 before meeting the given donor level 8. One must then continue along 17 towards the center until the correct donor level is intersected. This point will then determine the Fermi level.

While in the figures discussed thus far embodiments have been shown with essentially circular scales for the relative populations $n/N_c$, I have made corresponding data plates with other scales and shapes. It is possible to make a calculator of semicircular form or even reduce the shape to a sector little different from a quadrant of a circle. Other curves of conic section type have also been found convenient, particularly the hyperbolic, because of its relationship with the exponential functions, now used for the electron and impurity distributions.

Another embodiment with considerable advantages uses a logarithmic scale for the radial distance or energy fraction $E_f/E_g$. This is particularly useful when accurate readings are needed for substances with very small energy gaps (a few $kT$), such as indium antimonide. FIGURE 11 shows a donor disc 27 prepared for such a calculator.

It is further possible to make from this invention a more pretentious automatic analog computer in which the scales can be rotated by remote control and the intersections of the luminescent curves can be observed on a c.r. tube or, if the curves are made of conductive or photoconductive material, by coincidence circuits.

While I have shown and described preferred embodiments of my invention, it is to be understood that various modifications and changes may be made without departing from the spirit and scope of my invention and I desire to be limited only by the scope of the appended claims.

I claim:
1. A semiconductor circular sliderule comprising: a base disc inscribed with a large and a small circle representing the conduction and valence band edges, the distance $E_g/kT$ apart, where $E_g$ is the energy gap of semiconductor, $k$ Boltzmans constant and $T$ the absolute temperature, whereby radial distances in the space between said circles are measured in terms of $\Delta E/kT$ where $\Delta E$ is an energy difference, a peripheral logarithmic scale for the density $n$ of current carriers expressed as the ratio $n/N_c$, where $N_c$ is a material constant for electrons at the temperature $T = 300°$ K., and curves

$$n/N_c = \exp \frac{E_c - E_F}{kT}$$

and $$p/N_V = \exp \frac{E_F - E_V}{kT}$$

where $E_c$ is the energy of conduction band edge, $E_v$ energy of valence band edge and $E_F$ is the Fermi energy, related to said scale and said radial energy ratio; pivoted concentrically over said base disc a transparent disc inscribed with spaced radial lines representing percentage ionization of donors, and with a family of curves emanating from the first of said radial lines according to the equation:

$$\frac{n_d^+}{N_c} = \frac{n_d}{N_c} \cdot \frac{1}{1 + 2\exp\frac{E_d - E_F}{kT}}$$

related to said scale and said radial energy ratio, representing donor impurities having energy levels $E_d$ and densities $n_d$ of which the fraction $n_d^+$ is ionized; a transparent radial cursor inscribed with a scale for the energy $$\frac{E_c - E_F}{kT}$$

pivotally rotatable over said discs, whereby problem solutions such as the Fermi-level can be found at the intersection of a particular donor energy curve selected from said family of curves, when the first radial line is rotated to the concentration $n_d/N_c$ on said peripheral scale, with one of said curves on the base disc; and a sliding cursor on said radial cursor; where $p =$ number of holes, $N_v =$ material constant.

2. A semiconductor circular sliderule as defined in claim 1, having a second transparent disc inscribed with a family of curves according to the equation:

$$\frac{n_a^-}{N_V} = \frac{n_a}{N_V} \cdot \frac{1}{1 + 2\exp\frac{E_F - E_a}{kT}}$$

where $n_a^-$, $n_a$ and $E_a$ characterize acceptor impurities in the semiconductor and refer to said coordinates and where $N_v$ is a material constant for holes at the temperature $T = 300°$ K.

3. A semiconductor circular sliderule comprising: a first disc inscribed with a large and a small semicircle representing the conduction and valence bands respectively unity energy distance apart, whereby energy distances in the space between said semicircles are measured radially to scale as fractions $E/E_g$ where $E$ is the independent energy variable and $E_g$ is the gap energy represented as unity, a peripheral logarithmic scale for the density of current carriers $n$ expressed as the ratio $n/N_c$, where $N_c$ is a material constant at the temperature 300° K., and curves $$E_F/E_g = \pm kT/E_g \ln \frac{n}{N_c}$$

where $E_F$ is the Fermi energy, $k$ Boltzmans constant, $T$ the absolute temperature, plotted relative to said radial and logarithmic scales, and in the second half of said first disc a nomogram comprising a family of spiral curves inscribed with population numbers $(n/N_c)^b$ extending the range of said peripheral scale and representing other gap energy and temperature values according to the exponent $$b = \frac{E_g \cdot 300}{T}$$

a second, transparent, disc centered and rotatable over said first disc, inscribed with a family of curves according to the equation:

$$\frac{n_d^+}{N_c} = \frac{n_d}{N_c} \cdot \frac{1}{1 + 2\exp\left(\frac{E_d}{E_g} - \frac{E_F}{E_g}\right)\frac{E_g}{kT}}$$

related to said normalized scales, representing donor impurities $n_d$ in said semiconductor having energy levels $E_d$ as the ratios $E_d/E_g$ and densities $n_d/N_c$ of which $n_d^+/N_c$ are ionized; a transparent radial hairline cursor with a scale for the energy $E/E_g$ on one end and a scale for the exponent $b$ at the other end, concentrically rotatable over said discs, whereby problem solutions such as the Fermi-level $E_F$ can be read out as found at the intersection of a particular impurity energy line $E_d/E_g$ on the second disc with one of said curves on the first disc.

References Cited in the file of this patent

UNITED STATES PATENTS

| | | |
|---|---|---|
| 7,961 | Nystrom | Mar. 4, 1851 |
| 2,528,518 | Huber | Nov. 7, 1950 |
| 2,853,236 | Culbertson | Sept. 23, 1958 |

FOREIGN PATENTS

| | | |
|---|---|---|
| 189,518 | Great Britain | Nov. 29, 1922 |
| 564,520 | Great Britain | Oct. 2, 1944 |